United States Patent [19]

Noguchi

[11] Patent Number: 5,588,722
[45] Date of Patent: Dec. 31, 1996

[54] BRAKING SYSTEM HAVING MECHANISM FOR CONTROLLING RESISTANCE OF FLUID FLOW FROM PUMP INTO LOW-PRESSURE BRAKE CYLINDER DEPENDING UPON PRESSURE DIFFERENCE BETWEEN LOW-PRESSURE AND HIGH-PRESSURE BRAKE CYLINDERS

[75] Inventor: Noboru Noguchi, Nagoya, Japan

[73] Assignee: Toyota Jidosha Kabushiki Kaisha, Toyota, Japan

[21] Appl. No.: 548,894

[22] Filed: Oct. 26, 1995

[30] Foreign Application Priority Data

Nov. 11, 1994 [JP] Japan ..................... 6-277416

[51] Int. Cl.$^6$ ..................................... B60T 13/00
[52] U.S. Cl. ................. 303/186; 303/113.5; 303/115.4
[58] Field of Search ................ 303/113.5, 115.1, 303/115.4, 116.1, 116.2, 119.1, 119.2, 117.1, 187, 186, 9.75, 84.1

[56] References Cited

U.S. PATENT DOCUMENTS 5,028,096  7/1991  De la Broise ................... 303/115.4
5,143,428  9/1992  Toda et al. ...................... 303/900 X
5,354,123  10/1994  Albert ............................ 303/116.2 X

FOREIGN PATENT DOCUMENTS

4122645   1/1993  Germany.
63-34272A 2/1988  Japan.

Primary Examiner—Lee W. Young
Attorney, Agent, or Firm—Kenyon & Kenyon

[57] ABSTRACT

A braking system including a pump for delivering a pressurized fluid toward two brake cylinders, an electrically operated pressure control device connected to a reservoir, pump and two brake cylinders, a controller for electrically controlling the pressure control device to control the pressures in the two brake cylinders, and a flow resistance control mechanism provided in a pump passage connecting the pump and the two brake cylinders. The mechanism operates to control fluid flows during operation of the pump such that when the pressures in the two brake cylinders have a relatively large difference, a resistance of fluid flow from the pump toward a low-pressure cylinder of the two brake cylinders is increased.

9 Claims, 4 Drawing Sheets

BRAKING SYSTEM HAVING MECHANISM FOR CONTROLLING RESISTANCE OF FLUID FLOW FROM PUMP INTO LOW-PRESSURE BRAKE CYLINDER DEPENDING UPON PRESSURE DIFFERENCE BETWEEN LOW-PRESSURE AND HIGH-PRESSURE BRAKE CYLINDERS

BACKGROUND OF THE INVENTION

1. Field of the Invention

The present invention relates in general to a braking system wherein fluid pressures in two brake cylinders are increased by distributing pressurized fluid delivered from a pump to the two brake cylinders, and more particularly to techniques for optimizing rates of increase of the fluid pressures in these two brake cylinders.

2. Discussion of the Related Art

A braking system for a motor vehicle may be required to electrically control the fluid pressures in brake cylinders for wheels of the vehicle. For example, the electrical control of the fluid pressures in the wheel brake cylinders is required to effect anti-lock control of the wheel brake cylinder pressures so as to prevent or reduce locking tendencies of the wheels upon brake application to the vehicle, or effect "braking effect" control of the wheel brake cylinder pressures so that the actual braking effect as represented by actual deceleration of the vehicle by brake application coincides with a value desired by the vehicle operator, irrespective of fluctuating factors such as a variation in friction coefficient of friction members used in hydraulically operated wheel brakes.

A vehicle braking system may have a pressure application sub-system which includes brake cylinders for a left and a right wheel of the vehicle. An example of this kind of vehicle braking system is a braking system of X-crossing or diagonal type having two pressure application sub-systems one of which has brake cylinders for a front left wheel and a rear right wheel, and the other of which has brake cylinders for a front right wheel and a rear left wheel.

JP-A-63-34272 discloses one example of a motor vehicle braking system which is capable of electrical control of the wheel brake cylinder pressures as described above and which has a pressure application sub-system as also described above. This braking system includes a reservoir, a pump alternately turned on and off to pressurize a working fluid received from the reservoir so as to intermittently deliver the pressurized fluid, two brake cylinders to which the pressurized fluid delivered from the pump is distributed, an electrically operated pressure control device connected to the reservoir, pump and the two brake cylinders, and a controller for electrically controlling the electrically operated pressure control valve to electrically control the fluid pressures in the two brake cylinders.

The assignee of the present invention developed a braking system as one form of the braking system described just above. This braking system is a diagonal or X-crossing type braking system for a four-wheel motor vehicle, which has two mutually independent pressure application sub-systems connected to respective two pressurizing chambers of a master cylinder. Each of the two pressure application sub-systems includes (a) a reservoir, (b) a pump which is alternately turned on and off to pressurize a working fluid received from the pump so as to intermittently deliver the pressurized fluid, (c) a pump passage which is connected to a delivery port of the pump and which has two branch passages, (d) two wheel brake cylinders which are connected to the ends of the respective branch passages of the pump passage and to which the pressurized fluid delivered from the pump is distributed, (e) a flow restrictor provided in each of the branch passages, (f) a electrically operated pressure control device connected to the reservoir, pump and two wheel brake cylinders, and (g) a controller which is operated upon brake application to the vehicle, to electrically control the electrically operated pressure control device for electrically controlling pressures in the two wheel brake cylinders, so as to prevent locking tendencies of the wheels corresponding to the wheel brake cylinders. It is noted that the reservoir is used commonly for the two pressure application sub-systems.

A further research by the inventor of the present invention on the braking system developed by the assignee of the present invention revealed the following fact:

In the developed braking system, the pressurized delivered from the pump is distributed to the two wheel brake cylinders through the flow restrictors provided in the branch passages of the pump passage. In an anti-lock control pressure operation of the braking system, the pump is held operated so that the pressurized fluid from the pump can be supplied at any time to the wheel brake cylinders. In some running condition of the vehicle, there exists a difference between the fluid pressures in the two wheel brake cylinders. For example, such a pressure difference exists when the vehicle is running on a road surface whose left and right areas have different friction coefficient values. While the delivery pressure of the pump is higher than the higher one of the pressures in the two wheel brake cylinder (hereinafter referred to as "high-pressure brake cylinder and low-pressure brake cylinder"), the pressurized fluid delivered from the pump is distributed to the high-pressure and low-pressure wheel brake cylinders, whereby the pressures in the high- and low-pressure brake cylinders are simultaneously increased.

When there exists a relatively large pressure difference between the two wheel brake cylinders, however, the rate of increase of the pressure in the high-pressure brake cylinder tends to be low. That is, when the pump is operated with a relatively large pressure difference of the two wheel brake cylinders, the delivery pressure of the pump is considerably higher than the pressure in the low-pressure brake cylinder, but is only slightly higher than the pressure in the high-pressure brake cylinder. Consequently, it is difficult for the pressurized fluid delivered from the pump to be fed into the high-pressure brake cylinder, and the amount of the pressurized fluid distributed from the pump to the high-pressure brake cylinder tends to be insufficient. As a result, the rates of increase of the pressures in the two wheel brake cylinders cannot be sufficiently equalized. Thus, the braking system suffers from poor controllability of the pressures in the two wheel brake cylinders.

SUMMARY OF THE INVENTION

It is therefore a principal object of the present invention to provide a braking system which assures an optimum rate of increase of the pressure in the high-pressure brake cylinder by the pressurized fluid delivered from the pump, even when there exists a relatively large pressure difference between the high-pressure and low-pressure brake cylinders.

The present inventor also found the following fact.

That is, the amount of the pressurized fluid delivered from the pump into the high-pressure brake cylinder can be increased by supplying the entire amount of the pressurized fluid delivered from the pump toward the high-pressure brake cylinder during operation of the pump, and inhibiting the flow of the fluid from the high-pressure cylinder toward the low-pressure brake cylinder while the pump is not operated. However, this arrangement may have a risk of insufficient amount of supply of the fluid to the low-pressure brake cylinder.

It is therefore an optional object of this invention to provide a braking system as indicated above, which assures an optimum rate of increase of the pressure in the low-pressure brake cylinder by a flow of the fluid to the low-pressure brake cylinder from at least one of the pump and the high-pressure brake cylinder, during at least one of the delivery and non-delivery periods of the pump.

The principal object indicated above may be achieved according to the principle of the present invention, which provides a braking system comprising: (a) a reservoir for storing a working fluid; (b) a pump which is alternately turned on and off to pressurize the working fluid received from the reservoir so as to intermittently deliver the pressurized fluid; (c) two brake cylinders to which the pressurized fluid delivered from the pump is distributed; (d) an electrically operated pressure control device connected to the reservoir, pump and two brake cylinders, and a controller for electrically controlling the electrically operated pressure control device to electrically control the pressures in the two brake cylinders; and (e) a flow resistance control mechanism provided in a pump passage connecting the pump and the two brake cylinders. The flow resistance control mechanism controls flows of the working fluid during operation of the pump such that when a difference between pressures of the fluid in the two brake cylinders is relatively large, a resistance of flow of the fluid from the pump toward a low-pressure cylinder of the two brake cylinders is increased relative to a resistance of flow of the fluid from the pump toward a high-pressure cylinder of the two brake cylinders.

The flow resistance control mechanism may be either pilot-operated according to the pressures in the low-pressure and high-pressure cylinders, or an electrically controlled.

The present braking system was developed in view of the fact that when the pressure difference between the two brake cylinders is relatively large, the pressure of the pressurized fluid delivered from the pump is only slightly higher than the pressure in the high-pressure cylinder, it is difficult for the pressurized fluid to be supplied from the pump to the high-pressure cylinder.

In the present braking system including the flow resistance control mechanism, the resistance of flow of the fluid from the pump toward the low-pressure cylinder relative to the resistance of flow of the fluid from the pump toward the high-pressure cylinder is made larger when the pressure difference between the low-pressure and high-pressure cylinders is relatively large than when this pressure difference is relatively low. This arrangement makes it difficult for the pressurized fluid delivered from the pump to be fed toward the low-pressure cylinder, and makes it accordingly easy for the pressurized fluid to be fed toward the high-pressure cylinder. As a result, the amount of the pressurized fluid delivered from the pump which is distributed to the high-pressure cylinder is increased. Thus, the present braking system assures optimum distribution of the pressurized fluid delivered from the pump to the high-pressure and low-pressure brake cylinders, thereby optimizing the rates of increase of the pressure in the two brake cylinders. In other words, the present invention facilitates the control of the fluid pressures in the two brake cylinders, leading to improved safety of operation of a motor vehicle for which the braking system is used.

In one preferred form of the present invention, the flow resistance control mechanism includes at least one pilot-operated variable flow restrictor valve which is operated in response to the difference between the pressures in the two brake cylinders.

In one advantageous arrangement of the above preferred form of the invention, a single pilot-operated variable flow restrictor valve is used as the flow resistance control mechanism. This variable flow restrictor valve includes a housing, a movable member movably supported by the housing and cooperating with the housing to define two pilot pressure chambers on opposite sides of the movable member, at least one valve member, and two valve seats. The two pilot pressure chambers receive the pressures in the two brake cylinders, respectively. The at least one valve member and the two valve seats are provided between the pump and the two brake cylinders, such that the relative position of each valve member and the two valve seats changes according to a movement of the movable member. The two valve seats partially define the two pilot pressure chambers which correspond to the high-pressure and low-pressure cylinders, respectively. The at least one valve member and the two valve seats are formed so as to increase the resistance of flow of the fluid from the pump toward the low-pressure cylinder when the at least one valve member is moved toward one of the two valve seats which corresponds to the low-pressure cylinder. For example, the movable member consists of a piston, and the at least one valve member consists of two valve members which are supported at opposite ends of the piston. Alternatively, the at least one valve member consists of one valve member which also functions as the movable member.

In another advantageous arrangement of the first preferred form of the invention described above, the flow resistance control mechanism includes two pilot-operated variable flow restrictor valves which have respective two valve members disposed in respective two pilot pressure chambers which are formed between the pump and the two brake cylinders, respectively. Each of the two valve members receives the pressure in a corresponding one of the two brake cylinders and a delivery pressure of said pump, Each of the two variable flow restrictor valves has at least one valve seat. The two valve members and the valve seats of the variable flow restrictor valves are formed so as to increase the resistance of flow of the fluid from the pump toward the low-pressure cylinder when one of the valve members is moved toward the valve seat which corresponds to the low-pressure cylinder.

The optional object indicated above may be achieved according to a second preferred form of this invention, wherein the braking system further comprises a flow permitting mechanism provided in the pump passage. This flow permitting mechanism permits a flow of the working fluid toward the low-pressure cylinder from at least one of the pump and the high-pressure brake cylinder, during at least one of a delivery period and a non-delivery period of the pump.

In the present braking system including the flow permitting mechanism, the low-pressure cylinder is communicated with the pump or the high-pressure cylinder during at least one of the delivery period and the non-delivery period,of the pump, so that the fluid is fed to the low-pressure cylinder from the pump during the delivery period of the pump, or from the high-pressure cylinder during the non-delivery period of the pump. Therefore, the amount of the pressurized fluid supplied from the pump to the high-pressure cylinder is increased while more or less permitting the pressurized fluid to be fed from the pump toward the low-pressure cylinder.

In one advantageous arrangement of the above second preferred form of this invention, the flow resistance control mechanism includes at least one pilot-operated flow restrictor valve which is operated in response to the difference between the pressures in the two brake cylinders. Each of the at least one flow restrictor valve includes at least one valve member and at least two valve seats which are formed such that a relative position between the at least one valve member and the at least two valve seats changes according to the difference between the pressures in the two brake cylinders. The flow permitting mechanism has at least one groove formed in at least one of the at least one valve member and the at least two valve seats, or at least one protrusion formed on at least one of the at least one valve member and the at least two valve seats. The groove or grooves and the protrusion or protrusions permit the fluid to flow from the at least one of the pump and the high-pressure cylinder toward the low-pressure cylinder even when the at least one valve member is seated on one of the at least two valve seats.

BRIEF DESCRIPTION OF THE DRAWINGS

The above and optional objects, features, advantages and technical significance of this invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
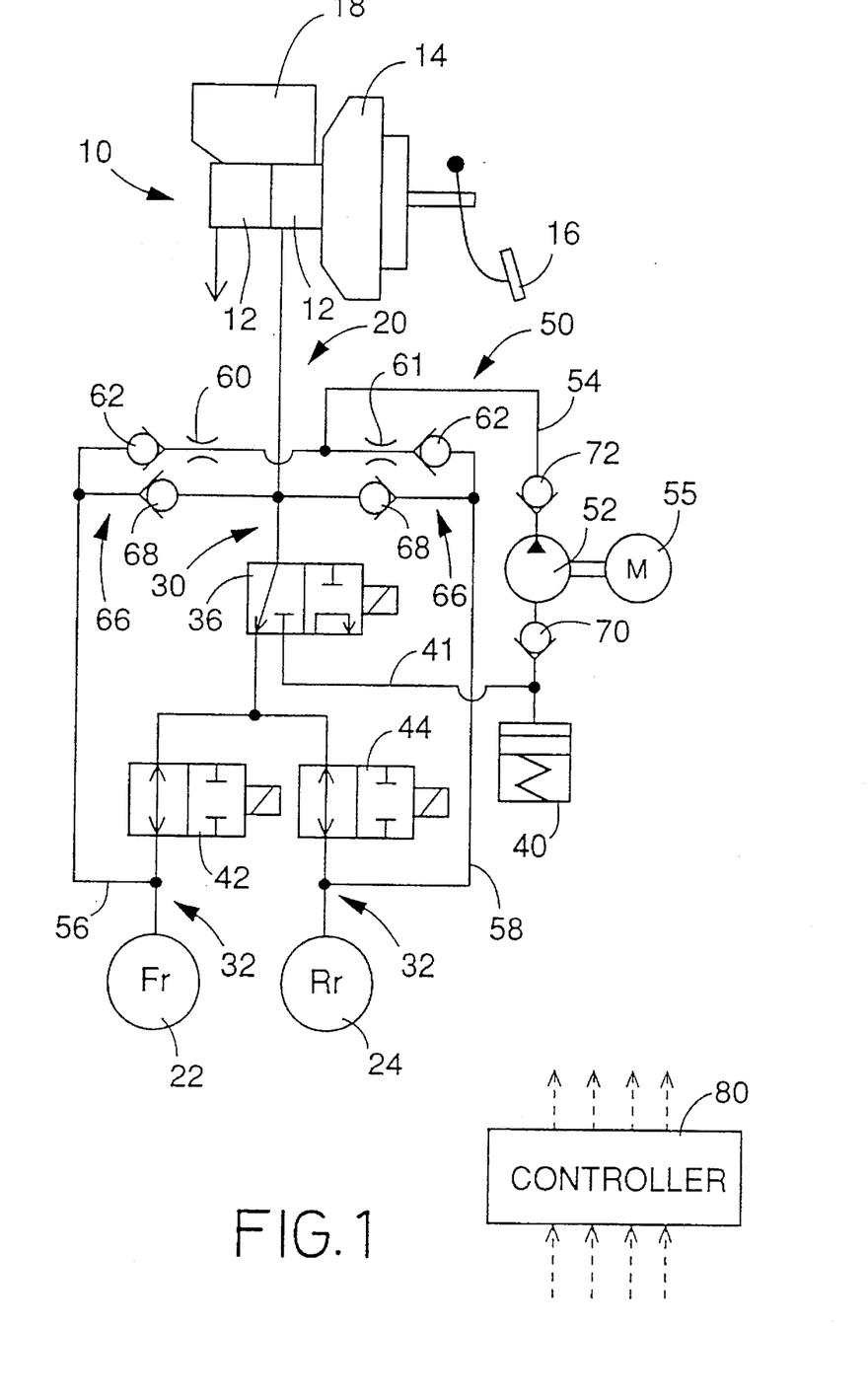
FIG. 1 is a schematic view illustrating a braking system which was developed by the assignee of the present invention before the invention was made.

Referring first to FIG. 1, there is shown a braking system for a motor vehicle, over which an improvement was made according to the present invention.

In FIG. 1, reference numeral 10 denotes a master cylinder of tandem type, which have two mutually independent pressurizing chambers 12, 12 disposed in series. The master cylinder 10 is operatively connected to a brake pedal 16 through a booster 14, so that substantially equal pressures are mechanically produced in the two pressurizing chambers 12, according to an amount of operation of the brake pedal 16 or a depression force acting on the brake pedal 16. The master cylinder 10 is provided with a reservoir 18 for supplying the two pressurizing chambers 12 with a working fluid.

One of the two pressurizing chambers 12 is connected to brake cylinders for a front left and a rear right wheel of the motor vehicle, while the other pressurizing chamber 12 is connected to brake cylinders for a front right and a rear left wheel of the vehicle. Thus, the present braking system is a diagonal or X-cross type braking system including two pressure application sub-systems connected to the two pressurizing chambers 12 of the master cylinder 10, respectively. Each pressure application sub-system includes a front wheel brake cylinder 22 and a rear wheel brake cylinder 24. One of the two pressure-application sub-systems is illustrated in FIG. 1, and will be described hereinafter. The other sub-system has the same construction.

The appropriate pressurizing chamber 12 of the master cylinder 10 is connected to the front wheel brake cylinder 22 and the rear wheel brake cylinder 24 through a primary fluid passage 20. The primary fluid passage 20 consists of a main portion 30 extending from the pressurizing chamber 12, and two branch portions 32, 32 connected to the front and rear wheel brake cylinders 22, 24, respectively.

A solenoid-operated directional control valve 36 is provided in the main portion 30 of the primary fluid passage 20. The directional control valve 36 is normally placed in a pressure-increase position in which the two wheel brake cylinders 22, 24 are disconnected from a reservoir 40 and are communicated with the master cylinder 10. When the solenoid of the directional control valve 36 is energized, the valve 36 is brought to a pressure-decrease position in which the two wheel brake cylinders 22, 24 are disconnected from the master cylinder 10 and are communicated with the reservoir 40 through a reservoir passage 41. Two normally-open solenoid-operated shut-off valves 42, 44 are provided in the respective branch portions 32 of the primary fluid passage 20.

In a normal operation of the braking system, the master cylinder 10 is in fluid communication with the front and rear wheel brake cylinders 22, 24 through the directional control valve 36 and the shut-off valves 42, 44, so that the pressures in the wheel brake cylinders 22, 24 are controlled depending upon the operation of the master cylinder 10. In an anti-lock pressure control operation of the braking system, the solenoid-operated directional control valve 36 is energized and placed in the pressure-decrease position, and the solenoid-operated shut-off valves 42, 44 are energized as needed, so that the fluid in the wheel brake cylinder 22, 24 corresponding to the energized shut-off valve 42, 44 is discharged toward the reservoir 40 through the energized shut-off valve 42, 44 and the energized directional control valve 36, whereby the pressure in the wheel brake cylinder 22, 24 corresponding to the energized shut-off valve 42, 44 is lowered, so as to prevent or reduce locking tendency of the corresponding wheel.

A pump passage 50 is connected at one end thereof to a delivery side of a pump 52, and at the other end to a portion of each branch portion 32 between the shut-off valve 42, 44 and the wheel brake cylinder 22, 24. The pump passage 50 consists of a main portion 54 extending from the delivery port of the pump 52, and two branch portions 56, 58 connected to the respective branch portions 32, 32. The pump 52 is of a plunger type driven by an electric motor 55 at a speed of about 3000 r.p.m. The pump 52 pressurizes the working fluid received from the reservoir 40 and intermittently delivers the pressurized fluid by a relatively small amount at one time. During the anti-lock pressure control operation of the braking system, the pressures in the wheel brake cylinders 22, 24 are increased by operation of the pump 52.

In each of the two branch portions 56, 58 of the pump passage 50, there are provided a fixed flow restrictor 60, 61 and a check valve 62, which are disposed in series in the order of description in the direction from the pump 52 toward the wheel brake cylinder 22, 24. The check valve 62 permits a flow of the fluid in the above-indicated direction, and inhibits a flow of the fluid in the reverse direction.

To a portion of each branch portion 56, 58 between the check valve 62 and the wheel brake cylinder 22, 24, there is connected one end of a return passage 66, which is connected at the other end to a portion of the main portion 30 of the primary passage 20 between the master cylinder 10 and the solenoid-operated directional control valve 36. The return passage 66 is provided with a check valve 68 which permits a flow of the fluid in the direction from the branch portion 56, 58 toward the master cylinder 10, and inhibits a flow of the fluid in the reverse direction.

The pump 52 is connected at its suction portion to the reservoir 40 through a suction valve 70, which functions as a check valve for inhibiting a flow of the fluid in the direction from the pump 52 toward the reservoir 40. A delivery valve 72 is provided in a portion of the pump passage 50 between the delivery port of the pump 52 and the flow restrictors 60, 61. The delivery valve 72 functions as a check valve for inhibiting a flow of the fluid in the direction from the flow restrictors 60, 61 toward the delivery port of the pump 52.

The solenoid-operated directional control valve 36, two solenoid-operated shut-off valves 42, 44 and electric motor 55 for the pump 52 are controlled by a controller 80 which is principally constituted by a computer incorporating a central processing unit (CPU), a read-only memory (ROM) and a random-access memory (RAM). The controller 80 is adapted to receive output signals of various sensors indicative of an operation of the brake pedal 16, a running speed of the vehicle, rotating speeds of the individual wheels, etc. The ROM stores various control programs for controlling the braking system. The controller 80 operates according to the control programs and the output signals of the sensors, while utilizing a temporary data storage function of the RAM, to check if each wheel has a locking tendency during brake application to the vehicle, and control the valves 36, 42, 44 and motor 55 so as to regulate the pressures in the wheel brake cylinders 22, 24 in an anti-lock control fashion so as to remove or reduce the locking tendency of each wheel.

The anti-lock control operation of the present braking system is effected in the following manner.

Where the rear wheel has a locking tendency prior to or without a locking tendency of the front wheel, for example, due to an excessively high pressure in the rear wheel brake cylinder 24, the motor 55 is activated, and the solenoid-operated shut-off valve 42 for the front wheel is energized and placed in the closed position, so that the front wheel brake cylinder 22 is disconnected from the directional control valve 36 and the reservoir 40. Then, the directional control valve 36 is energized and placed in the pressure-decrease position, so that the rear wheel brake cylinder 24 is communicated with the reservoir 40 through the shut-off valve 44 (for the rear wheel brake cylinder 24) and the directional control valve 36.

As a result, the pressurized fluid delivered from the pump 52 is supplied to the rear wheel brake cylinder 24, but is immediately discharged from the rear wheel brake cylinder 24 into the reservoir 40. Thus, the pressure in the rear wheel brake cylinder 24 is lowered. On the other hand, the pressure in the front wheel brake cylinder 22 is raised up to an upper limit equal to the level of the pressure in the master cylinder 10, as a result of a supply of the pressurized fluid thereto from the pump 52, since the front wheel brake cylinder 22 is disconnected from the reservoir 40. The rate of increase of the pressure in the front wheel brake cylinder 22 is relatively low because only a portion of the fluid delivered from the pump 52 is supplied to the front wheel brake cylinder 22. After the pressure in the front wheel brake cylinder 22 has been raised to the above-indicated upper limit, the pressure is maintained at that upper limit.

In the present braking system, the two solenoid-operated shut-off valves 42, 44 are provided in parallel with each other in relation to the reservoir 40. In other words, the two shut-off valves 42, 44 for the respective front and rear wheel brake cylinders 22, 24 can be controlled independently of each other, so that it is possible to concurrently achieve a decrease of the pressure in the rear wheel brake cylinder 24 and a slow increase or holding of the pressure in the front wheel brake cylinder 22.

After the locking tendency of the rear wheel is removed as a result of a decrease of the pressure in the rear wheel brake cylinder 24, the shut-off valve 44 for the rear wheel is energized and disconnected from the reservoir 40, so that a discharge flow of the fluid from the rear wheel brake cylinder 24 toward the reservoir 40 is inhibited. Consequently, the delivery pressure of the pump 52 is raised and eventually exceeds the pressure in the rear wheel brake cylinder 24, whereby the pressurized fluid delivered from the pump 52 is fed into the rear wheel brake cylinder 24, so that the pressure in the rear wheel brake cylinder 24 is increased by the pump 52.

The motor 55 is held operated during the anti-lock pressure control operation, and the pump 52 continues to deliver the pressurized fluid as long as the working fluid is present in the reservoir 40. While the pressure in the rear wheel brake cylinder 24 is increased by the pump 52, the pressure in the front wheel brake cylinder 22 is maintained until the delivery pressure of the pump 52 exceeds the pressure in the front wheel brake cylinder 22. After the delivery pressure of the pump 52 exceeds the pressure in the front wheel brake cylinder 22, not only the pressure in the rear wheel brake cylinder 24 but also the pressure in the front wheel brake cylinder 22 are raised by operation of the pump 52.

The pressurized fluid delivered from the pump 52 in operation is fed toward the front and rear wheel brake cylinders 22, 24 through the fixed flow restrictors 60, 61, respectively. These flow restrictors 60, 61 makes it possible to simultaneously increase the pressures in both of the front and rear wheel brake cylinders 22, 24 when the delivery pressure of the pump 52 is higher than the pressure in the high-pressure one of the front and rear wheel brake cylinders 22, 24, even in the presence of a pressure difference between the two wheel brake cylinders 22, 24. The pressure difference may take place while the vehicle is running on an uneven road surface such that the front and rear wheels rotate in contact with respective left and right (or left and right) areas of the road surface which have relatively high and relatively low friction coefficient values, respectively, for example. In this specific example, the front wheel brake cylinder 22 is the high-pressure cylinder whose pressure is higher than the pressure in the rear wheel brake cylinder 24 as the low-pressure cylinder.

Usually, the pressure in the front wheel brake cylinder 22 is considerably higher than the pressure in the rear wheel brake cylinder 24 during brake application while the vehicle is running on the uneven road surface indicated above. Therefore, there arises a considerable difference between the rates of increase of the pressures in the front and rear wheel brake cylinders 22, 24 during an anti-lock pressure control operation of the braking system, for the reason explained below.

When there exists a relatively large difference between the pressures in the high-pressure front wheel brake cylinder 22 and the low pressure rear wheel brake cylinder 24, the delivery pressure of the pump 52 is only slightly higher than the pressure in the high-pressure front wheel brake cylinder 22. Therefore, the pressure difference across the fixed flow restrictor 60 corresponding to the front wheel brake cylinder 22 is smaller than the pressure difference across the fixed flow restrictor 61 corresponding to the rear wheel brake cylinder 24. Accordingly, the amount of the pressurized fluid distributed from the pump 52 to the front wheel brake cylinder 22 is smaller than that distributed to the rear wheel brake cylinder 24, whereby the rate of increase of the pressure in the high-pressure front wheel brake cylinder 22 considerably differs from that in the low-pressure rear wheel brake cylinder 24. Thus, it is difficult to accurately control the pressures in the front and rear wheel brake cylinders 22, 24 when there exists a relatively large pressure difference therebetween.

To solve the above problem, the present inventor proposed the following solution. That is, the effective cross sectional area of fluid communication of the fixed flow restrictor 61 for the low-pressure rear wheel brake cylinder 24 is made smaller than that of the fixed flow restrictor 50 for the high-pressure front wheel brake cylinder 22, so that a resistance of flow of the fluid from the pump 52 toward the low-pressure rear wheel brake cylinder 24 (hereinafter referred to as "rear-side flow resistance") is made larger than a resistance of flow of the fluid from the pump 52 toward the high-pressure front wheel brake cylinder 22 (hereinafter referred to as "front-side flow resistance"), so that a relatively large amount of the pressurized fluid delivered from the pump 42 can be supplied to the high-pressure front wheel brake cylinder 22.

However, the above solution was found to suffer from a drawback that the amount of the pressurized fluid supplied from the pump 52 to the low-pressure rear wheel brake cylinder 24 tends to be insufficient when the pressure difference between the two wheel brake cylinders 22, 24 is relatively small. To assure a sufficient amount of supply of the fluid from the pump 52 to the rear wheel brake cylinder 24 when the pressure difference is relatively small, the delivery capacity of the pump 52 should be increased. This undesirably leads to increased size and weight of the pump 52.

In the light of the above drawbacks, the present inventor worked out a technical solution in which the rear-side flow resistance is made substantially equal to the front-side flow resistance when the pressure difference between the two wheel brake cylinders 22, 24 is relatively small, and is made larger than the front-side flow resistance only when the pressure difference is relatively large. Namely, the resistance of flow of the fluid from the pump 52 toward the low-pressure wheel brake cylinder 24 relative to the resistance of flow of the fluid from the pump 52 toward the high-pressure wheel brake cylinder 22 is made larger when the pressure difference is relatively large than when the pressure difference is relatively small.

Figure 2:
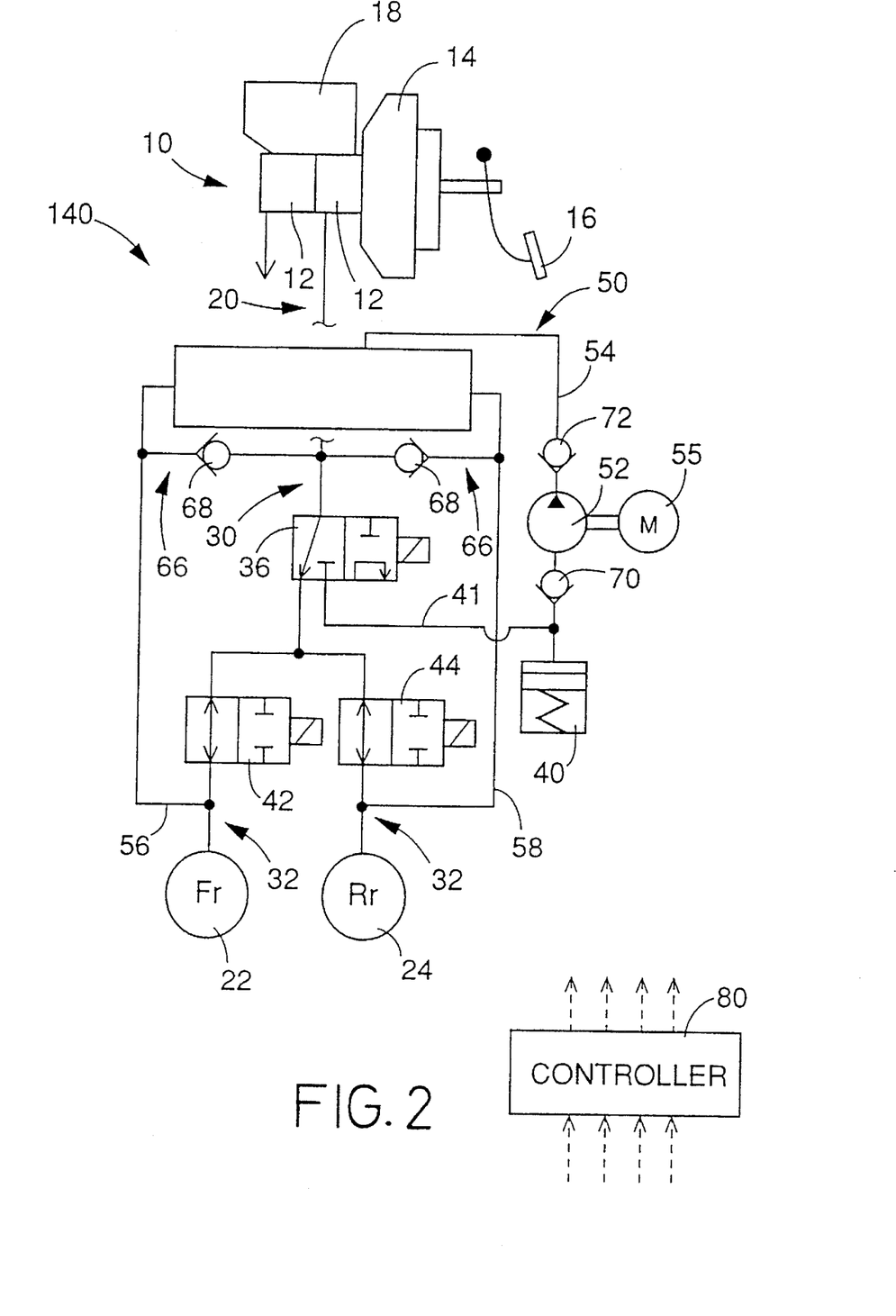
FIG. 2 is a schematic view illustrating one embodiment of a braking system of the present invention.

Referring next to FIG. 2, there is shown one embodiment of a braking system constructed according to the above technical solution, wherein a flow control device 140 is substituted for the two fixed flow restrictors 60, 61 and two check valves 62 used in the braking system of FIG. 1.

The present braking system of FIG. 2 is identical with the braking system of FIG. 1, except for the provision of the flow control device 140 in place of the flow restrictors 60, 61 and check valves 62. In the interest of simplification, only the flow control device 140 will be described in detail, without redundant description of the identical components.

Figure 3:
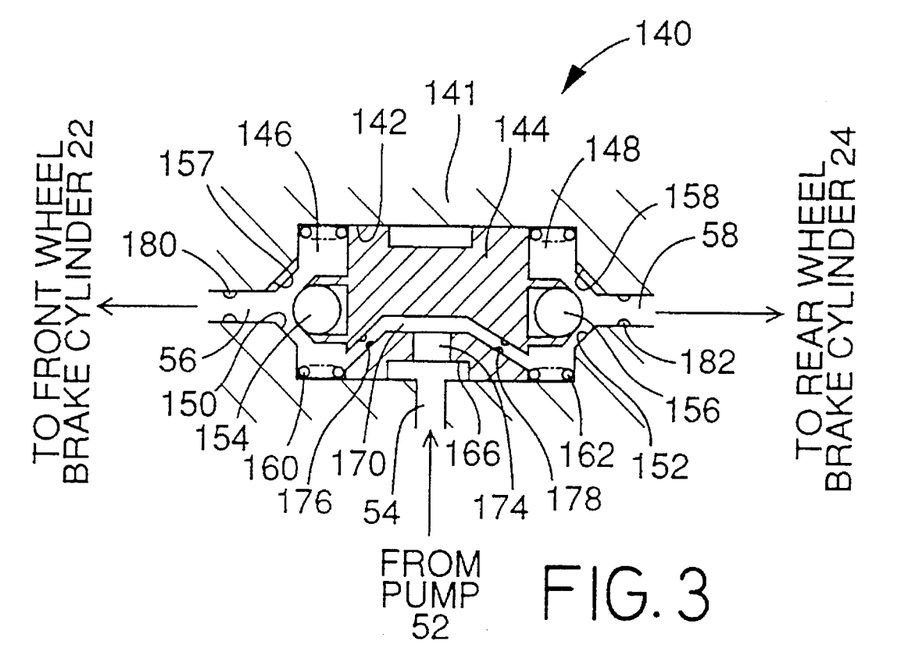
FIG. 3 is a cross sectional view in enlargement of a flow control device 140 provided in the braking system of FIG. 2.

As shown in FIG. 3, the flow control device 140 has a housing 141 in which is formed a cylindrical bore 142 that extends in the horizontal direction of the motor vehicle. A piston 144 (which functions as a movable member) is slidably movably received in the cylindrical bore 142. The housing 141 having the cylindrical bore 142 cooperates with the piston 144 to define a first valve chamber 146 in front of the piston 144 and a second valve chamber 148 behind the piston 144.

The branch portions 56, 58 of the pump passage 50 are open to the opposite ends of the cylindrical bore 142. Described in detail, a first valve seat 150 is formed at one end of the bore 142 so as to partially define the first valve chamber 146, while a second valve seat 152 is formed at the other end of the bore 142 so as to partially define the second valve chamber 148. The branch portion 56 connected to the front wheel brake cylinder 22 is open in the first valve seat 150, while the branch portion 58 connected to the rear wheel brake cylinder 24 is open in the second valve seat 152. Each of these valve seats 150, 152 has a conical surface. The piston 144 has a first valve member 154 and a second valve member 156 fixedly supported at its front and rear ends. The first and second valve members 154, 156 are moved with the piston 144 and are adapted to be seated on the respective first and second valve seats 150, 152 when the piston 144 is moved toward the valve seats 150, 152. Described more specifically, the first and second valve members 154, 156 are seated on the first and second valve seats 150, 152 when the piston 144 is moved from its neutral position of FIG. 3 to its fully advanced position (leftmost position as seen in FIG. 3) and fully retracted position (rightmost position). The first and second valve seats 150, 152 are formed with respective grooves 157, 158 extending in the radial direction. These grooves 157, 158 serve as a flow permitting mechanism which permits restricted flows of the fluid through the valve seats 150, 152 even when the valve members 154, 156 are seated on the respective valve seats 150, 152.

The piston 144 is biased in the opposite directions by a first and a second spring 160, 162 disposed in the respective first and second valve chambers 146, 148, so that the piston 144 is normally placed in its neutral position of FIG. 3. The pressures in the first and second valve chambers 146, 148 act on the opposite end faces of the piston 144 in the opposite direction. Accordingly, the piston 144 is moved to a position of equilibrium between a sum of the biasing force of the first spring 160 and a thrust force corresponding to the pressure in the first valve chamber 146 and a sum of the biasing force of the second spring 162 and a thrust force corresponding to the pressure in the second valve chamber 148.

The piston 144 has an annular groove 166 formed in an axially intermediate portion of the outer circumferential surface. On the other hand, the main portion 54 of the pump passage 50 is open in an axially intermediate portion of the cylindrical bore 142, so that the main portion 54 is always held in communication with the annular groove 166 irrespective of the position of the piston 144. Further, the piston 144 has an axial passage 170 formed therethrough such that the axial passage 170 is open at its opposite ends in the first and second valve chambers 146, 148. The axial passage 170 has an intermediate portion located at a substantially radially central part of the piston 144. The piston 144 also has a radial passage 174 which communicates with the intermediate portion of the axial passage 170 and the annular groove 166. The axial passage 170 has two fixed flow restrictors 176, 178 on the opposite sides of the point of communication between the axial passage 170 and the radial passage 174. The two fixed flow restrictors 176, 178 have the same effective diameter. The two branch portions 56, 58 of the pump passage 50 are provided with respective fixed flow restrictors 180, 182, which have the same effective diameter.

Figures 5, 6:
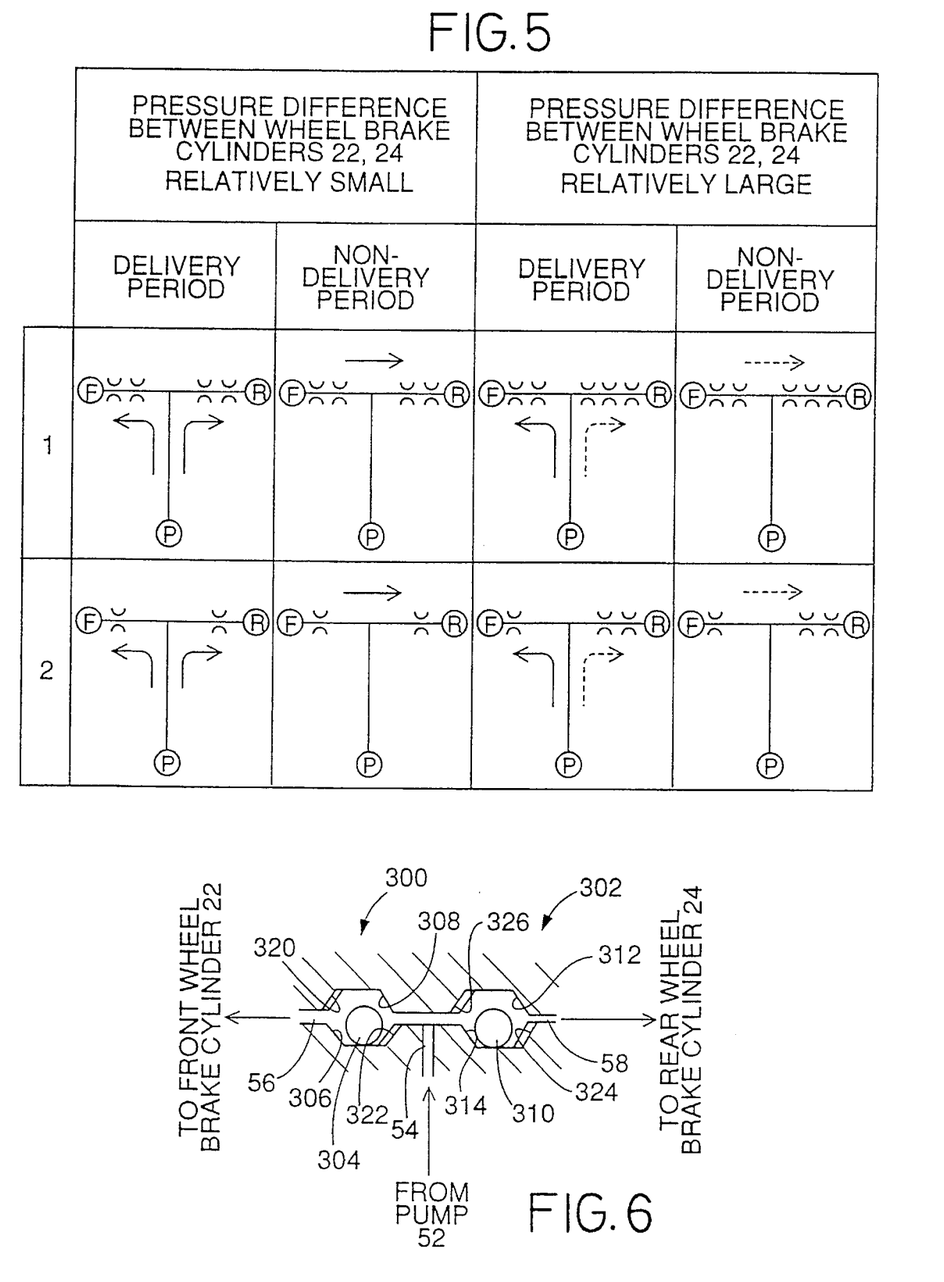
FIG. 5 is a view for explaining operations of the flow control devices of FIGS. 3 and 4.
FIG. 6 is a cross sectional view of a flow control device used in a further embodiment of the present invention.

Operations of the flow control device 140 will be described by reference to FIG. 3 and an upper part 1 of FIG. 5. Reference characters "F", "R" and "P" used in FIG. 5 represent the front wheel brake cylinder 22, rear wheel brake cylinder 24 and pump 52, respectively.

There will first be described an operation of the flow control device 140 where the pressure in the front wheel brake cylinder 22 is higher than that in the rear wheel brake cylinder 24, and the pressure difference (which may be zero) of the two wheel brake cylinders 22, 24 is relatively small.

In this case, the pressures in the first and second valve chambers 146, 148 during a delivery period of the pump 52 are substantially equal to each other since the pressure difference of the two wheel brake cylinders 22, 24 is relatively small. Accordingly, the pressures in the two wheel brake cylinders 22, 24 will cause substantially no axial movement of the piston 144. Thus, the piston 144 is held in its neutral position of FIG. 3 under the biasing forces of the springs 160, 162, and the two valve members 154, 156 are not seated on the respective valve seats 150, 152.

During the delivery period of the pump 52, therefore, the pressurized fluid delivered from the pump 52 is supplied to the front wheel brake cylinder 22 through the fixed flow restrictor 176, fully open first valve seat 146 (between the spaced-apart first valve seat and valve member 150, 154), and fixed flow restrictor 180, and to the rear wheel brake cylinder 24 through the fixed flow restrictor 178, fully open second valve seat 148 (between the spaced-apart second valve seat and valve member 152, 156), and fixed flow restrictor 182. Thus, the same amount of the pressurized fluid is supplied from the pump 54 to the front and rear wheel brake cylinders 22, 24.

During the non-delivery period of the pump 52, the piston 144 remains in the neutral position of FIG. 3, in which a portion of the pressurized fluid supplied to the front wheel brake cylinder 22 is supplied to the rear wheel brake cylinder 24 through the fixed flow restrictor 180, fully open first valve seat 146, fixed flow restrictors 176, 178, fully open second valve seat 148 and fixed flow restrictor 182.

Where the pressure difference of the front and rear wheel brake cylinders 22, 24 is zero, there arise no flows of the fluid through the flow control device 140.

There will next be described an operation of the flow control device 140 where the pressure in the front wheel brake cylinder 22 is considerably higher than that in the rear wheel brake cylinder 24.

In this case, the pressure in the first valve chamber 146 is higher than that in the second valve chamber 148 during the delivery period of the pump 52, since the pressure in the front wheel brake cylinder 22 is considerably higher than that in the rear wheel brake cylinder 24. As a result, the piston 144 is moved toward its fully retracted position (rightmost position), so that the second valve member 156 on the side of the rear wheel brake cylinder 24 is moved toward the second valve seat 152, and is eventually seated on the second valve seat 152 by the pressure difference.

During the delivery period of the pump 52, therefore, the fluid delivered from the pump 52 is supplied to the front wheel brake cylinder 22 through the fixed flow restrictor 176, fully open first valve seat 146 and fixed flow restrictor 180. At the same time, the fluid delivered from the pump 52 is supplied to the rear wheel brake cylinder 24 through the fixed flow restrictor 178, groove 158 (closed by the second valve member 156), and fixed flow restrictor 182. In this condition wherein the second valve member 156 is seated on the second valve seat 152, the resistance of flow of the fluid from the pump 52 toward the rear wheel brake cylinder 24 is larger than the resistance of flow of the fluid from the pump 52 toward the front wheel brake cylinder 22, whereby a larger amount of the pressurized fluid delivery from the pump 52 is supplied to the front wheel brake cylinder During the non-delivery period of the pump 52, the second valve member 156 remains in the fully retracted position and seated on the second valve seat 152. Accordingly, a portion of the fluid supplied to the front wheel brake cylinder 22 is supplied to the rear wheel brake cylinder 24 through the fixed flow restrictor 180, fully open first valve seat 146, fixed flow restrictors 176, 178, groove 158 closed by the second valve member 156, and fixed flow restrictor 182.

It is noted that during the non-delivery period of the pump 52, the fluid supplied from the front wheel brake cylinder 22 toward the rear wheel brake cylinder 24 should flow through also the fixed flow restrictors 180, 176, the amount of the fluid supplied from the front wheel brake cylinder 22 toward the rear wheel brake cylinder 24 is smaller during the non-delivery period of the pump 52 than the amount of supply of the fluid from the pump 52 toward the rear wheel brake cylinder 24 during the delivery period, which does not flow through the fixed restrictors 180, 176.

In the case where the pressure in the rear wheel brake cylinder 24 is higher than that in the front wheel brake cylinder 22, the flow control device 140 operates in the direction opposite to that in the above case described above.

It will be understood from the above description that the flow control device 140 constitutes a flow resistance control mechanism of pilot-operated type having two valve members, which is adapted to control the flows of the fluid during operation of the pump such that the resistance of flow of the fluid from the pump toward the low-pressure wheel brake cylinder 22, 24 relative to the resistance of flow of the fluid from the pump toward the low-pressure wheel brake cylinder 22, 24 is made larger when the pressure difference of the two wheel brake cylinders is relatively large than when the pressure difference is relatively small. It will also be understood that the grooves 157, 158 provided in the flow control device 140 constitute a flow permitting mechanism for permitting a flow of the fluid toward the low-pressure wheel brake cylinder 22, 24 from the pump 52 during the delivery period of the pump 52 and from the high-pressure wheel brake cylinder 22, 24 during the non-delivery period of the pump 52. It will further be understood that the piston 144, valve seats 150, 152 and valve members 154, 156 cooperate to constitute a pilot-operated variable flow restrictor valve.

Figure 4:
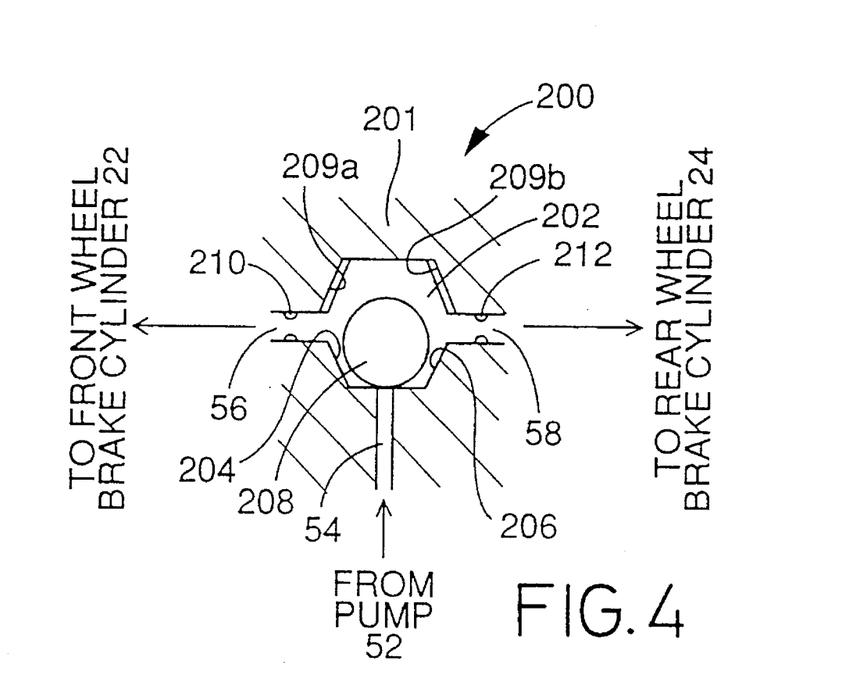
FIG. 4 is a cross sectional view of a flow control device 200 used in another embodiment of this invention.

Referring next to FIG. 4, there will be described a second embodiment of the present invention which is different from the first embodiment of FIGS. 2 and 3 in the construction of the flow control device.

That is, the second embodiment uses a flow control device 200 in place of the flow control device 140. As shown in FIG. 4, the flow control device 200 uses a housing 201 which has a valve chamber 202 extending in the vertical direction of the motor vehicle. The valve chamber 202 has two pilot pressure chamber portions which are opposed to each other in the horizontal direction and which communicate with the respective two branch portions 56, 58 of the pump passage 50. The main portion 54 of the pump passage 50 is open to a portion of the valve chamber 202 between the two pilot pressure chamber portions.

Described more specifically, a first valve seat 204 and a second valve seat 206 partially define the respective pilot pressure chamber portions of the valve chamber 202, and the branch portions 56, 58 of the pump passage 50 are open in the respective first and second valve seats 204, 206. Each of these valve seats 204, 206 has a conical surface. In the valve chamber 202, there is disposed a valve member 208 in the form of a ball. The valve member 208 also functions as a movable member having a position for contact with the first valve seat 204, a position for contact with the second valve seat 206, and a neutral position of FIG. 4 in which the movable member 208 is spaced apart from and is not seated on the first and second valve seats 204, 206. The valve seats 204, 206 are provided with respective grooves 209a, 209b formed so as to extend in the radial direction. These grooves 209a, 209b serve as a flow permitting mechanism which permits restricted flows of the fluid through the valve seats 204, 206 even when the valve member 208 is seated on the respective valve seats 204, 206.

The branch portions 56, 58 of the pump passage 50 are provided with respective flow restrictors 210, 212, which have the same effective diameter.

Operations of the flow control device 200 will be described by reference to FIG. 4 and a lower part 2 of FIG. 5.

There will first be described an operation of the flow control device 200 where the pressure in the front wheel brake cylinder 22 is higher than that in the rear wheel brake cylinder 24 and the pressure difference (which may be zero) is relatively small.

In this case where the pressure difference of the two wheel brake cylinders 22, 24 is relatively small, the pressures in the two pilot pressure chamber portions of the valve chamber 202 which communicates with the branch portions 56, 58 are substantially equal to each other during the delivery period of the pump 52. Consequently, there arises substantially no axial movement of the valve member 208, and the valve member 208 remains in the neutral position of FIG. 4 by gravity, and is not seated on the valve seats 204, 206.

In the above condition, the pressurized fluid delivered from the pump 52 during the delivery period of the pump is supplied to the front wheel brake cylinder 22 through the fully open valve seat 204 (between the spaced-apart valve seat 204 and valve member 208) and fixed flow restrictor 210. At the same time, the pressurized fluid is supplied from the pump 52 to the rear wheel brake cylinder 24 through the fully open second valve seat 206 (between the spaced-apart valve seat 206 and valve member 208) and fixed flow restrictor 212. Thus, substantially the same amount of the fluid is supplied from the pump 52 to the front and rear wheel brake cylinders 22, 24.

During the non-delivery period of the pump 52, the valve member 208 remains in the neutral position, so that a portion of the fluid supplied to the front wheel brake cylinder 22 is supplied to the rear wheel brake cylinder 24 through the fixed flow restrictor valve 210, fully open first and second valve seats 204, 206 and fixed flow restrictor 212.

Where the pressure difference between the two wheel brake cylinders 22, 24 is zero, there arise no flows of the fluid through the flow control valve 200.

There will next be described an operation of the flow control device 200 where the pressure in the front wheel brake cylinder 22 is considerably higher than that in the rear wheel brake cylinder 24.

In this case where the pressure difference of the two wheel brake cylinders 22, 24 during the delivery period of the pump 52 is relatively large, the pressure in the pilot pressure chamber portion of the valve chamber 202 which communicates with the front wheel brake cylinder 22 is higher than that in the pilot pressure chamber portion which communicates with the rear wheel brake cylinder 24. Consequently, the valve member 208 is moved toward the second valve seat 206 (in the right direction as seen in FIG. 4), and is eventually seated on the second valve seat 206.

As a result, the pressurized fluid delivered from the pump 52 is supplied to the front wheel brake cylinder 22 through the fully open first valve seat 204 and fixed flow restrictor 210, and to the rear wheel brake cylinder 24 through the groove 209b closed by the valve member 208, and fixed flow restrictor 212. Thus, the resistance of flow of the fluid from the pump 52 toward the rear or low-pressure wheel brake cylinder 24 is made smaller than the resistance of flow of the fluid from the pump 52 toward the front or high-pressure wheel brake cylinder 22, whereby a larger amount of the fluid is supplied from the pump 52 to the front wheel brake cylinder 22.

During the non-delivery period of the pump 52, the valve member 208 remains seated on the second valve seat 206, and a portion of the fluid in the front wheel brake cylinder 22 is supplied to the rear wheel brake cylinder 24 through the fixed flow restrictor 210, fully open first valve seat 204, groove 209b closed by the valve member 208, and fixed flow restrictor 212. In this case, too, the amount of the fluid supplied from the front wheel brake cylinder 22 to the rear wheel brake cylinder 24 is smaller than the amount of the fluid supplied from the pump 52 to the rear wheel brake cylinder 24 during the delivery period of the pump 52, in the presence of the fixed flow restrictor 210, for a reason similar to that described above with respect to the flow control valve 140.

In the case where the pressure in the rear wheel brake cylinder 24 is higher than that in the front wheel brake cylinder 22, the flow control device 200 operates in the direction opposite to that in the above case described above.

It will be understood from the above description of the second embodiment that the flow control device 200 constitutes a flow resistance control mechanism of pilot-operated type having one valve members, which is adapted to control the flows of the fluid during operation of the pump such that the resistance of flow of the fluid from the pump toward the low-pressure wheel brake cylinder 22, 24 relative to the resistance of flow of the fluid from the pump toward the low-pressure wheel brake cylinder 22, 24 is made larger when the pressure difference of the two wheel brake cylinders is relatively large than when the pressure difference is relatively small. It will also be understood that the grooves 209a, 209b provided in the flow control device 200 constitute a flow permitting mechanism for permitting a flow of the fluid toward the low-pressure wheel brake cylinder 22, 24 from the pump 52 during the delivery period of the pump 52 and from the high-pressure wheel brake cylinder 22, 24 during the non-delivery period of the pump 52. It will further be understood that the valve member 208 (movable member) and valve seats 204, 206 cooperate to constitute a pilot-operated variable flow restrictor valve.

It is noted that the flow control valve 140, 200 used in the illustrated embodiments described above is adapted to supply the pressurized fluid delivered from the pump 52 to not only the high-pressure wheel brake cylinder but also the low-pressure wheel brake cylinder during the delivery period of the pump, and to supply the fluid from the high-pressure wheel brake cylinder to the low-pressure wheel brake cylinder during the non-delivery period of the pump 52, so that the amount of the fluid distributed to the high-pressure wheel brake cylinder is larger than that distributed to the low-pressure wheel brake cylinder.

It is to be understood that the present invention is not limited to the details of the illustrated embodiments of FIGS. 3 and 4. For example, the grooves 157, 158 provided in the flow control device 140 of FIG. 3 and the grooves 209a, 209b provided in the flow control device 200 of FIG. 4 are not essential to practice the present invention, and may be eliminated so that the fluid delivered from the pump 52 during the delivery period of the pump 52 is supplied to only the high-pressure wheel brake cylinder, and the supply of the fluid from the high-pressure wheel brake cylinder to the low-pressure wheel brake cylinder is inhibited during the non-delivery period of the pump 52 so as to effectively increase the amount of the fluid supplied to the high-pressure wheel brake cylinder.

Further, the flow resistance control mechanism may be constituted by a first and a second variable flow restrictor valve 300, 302 according to a third embodiment of this invention. The flow restrictor valves 300, 302 correspond to the front and rear wheel brake cylinders 22, 24, respectively. The first variable flow restrictor valve 300 has a first valve member 304 and a pair of first valve seats 306, 308 on which the first valve member 304 is selectively seated. The first valve member 304 is moved toward and away from the first valve seats 306, 308 depending upon a difference between the delivery pressure of the pump 52 and the pressure in the front wheel brake cylinder 22. On the other hand, the second variable flow restrictor valve 302 has a second valve member 310 and a pair of second valve seats 312, 314 on which the second valve member 310 is selectively seated. The second valve member 310 is moved toward and away from the second valve seats 312, 314 depending upon a difference between the delivery pressure of the pump 52 and the pressure in the rear wheel brake cylinder 24. The valve seats 306, 308, 312, 314 are provided with respective grooves 320, 322, 324, 326. The cross sectional area of the groove 324 nearest to the rear wheel brake cylinder 24 is made smaller than that of the groove 320 nearest to the front wheel brake cylinder 22, so that a larger amount of the fluid delivered from the pump 52 is supplied to the front wheel brake cylinder 22. The grooves 320, 322, 324, 326 constitute a flow permitting mechanism for permitting the flows of the fluid even when the valve members 304, 310 are seated on the valve seats 306, 308, 312, 314.

While the present invention has been described in detail in its presently preferred embodiments, for illustrative purpose only, it is to be understood that the present invention is not limited to the details of the illustrated embodiments, but may be embodied with various changes, modifications and improvements, which may occur to those skilled in the art, without departing from the spirit and scope of the invention defined in the following claims.

For example, the grooves 157, 158, 209a, 209b, 320, 322, 324, 326 may be replaced by protrusions formed on the respective valve seats 150, 152, 204, 206, 306, 308, 312, 314, so that when the valve members 154, 156, 208, 304, 310 are brought into contact with the protrusions when the valve members are moved to their fully advanced or retracted positions (leftmost or rightmost positions), there are left some gap between the valve seats and the valve members, permitting flows of the fluid.

What is claimed is:

1. A braking system comprising:

a reservoir for storing a working fluid;

a pump which is operated to pressurize the working fluid received from the reservoir so as to intermittently deliver the pressurized fluid;

two brake cylinders to which the pressurized fluid delivered from the pump is distributed;

an electrically operated pressure control device connected to the reservoir, pump and two brake cylinders;

a controller for electrically controlling the electrically operated pressure control device to electrically control the pressures in the two brake cylinders; and a flow resistance control mechanism provided in a pump passage connecting said pump and said two brake cylinders, said flow resistance control mechanism controlling flows of the working fluid during operation of said pump such that when a difference between pressures of the fluid in said two brake cylinders is relatively large, a resistance of flow of the fluid from the pump toward a low-pressure cylinder of said two brake cylinders is increased relative to a resistance of flow of the fluid from the pump toward a high-pressure cylinder of said two brake cylinders.

2. A braking system according to claim 1, further comprising a flow permitting mechanism provided in said pump passage, said flow permitting mechanism permitting a flow of the working fluid toward said low-pressure cylinder from at least one of said pump and said high-pressure brake cylinder, during at least one of a delivery period and a non-delivery period of said pump.

3. A braking system comprising:

a reservoir for storing a working fluid;

a pump which is operated to pressurize the working fluid received from the reservoir so as to intermittently deliver the pressurized fluid;

two brake cylinders to which the pressurized fluid delivered from the pump is distributed;

an electrically operated pressure control device connected to the reservoir, pump and two brake cylinders;

a controller for electrically controlling the electrically operated pressure control device to electrically control the pressure in the two brake cylinders; and a valve provided in a pump passage connecting said pump and said two brake cylinders, said valve controlling flows of the working fluid during operation of said pump such that when a difference between pressures of the fluid in said two brake cylinders is relatively large, a resistance of flow of the fluid from the pump toward a low-pressure cylinder of said two brake cylinders is increased relative to a resistance of flow of the fluid from the pump toward a high-pressure cylinder of said two brake cylinders.

4. A braking system comprising:

a reservoir for storing a working fluid;

a pump which is operated to pressurize the working fluid received from the reservoir so as to intermittently deliver the pressurized fluid;

two brake cylinders to which the pressurized fluid delivered from the pump is distributed;

an electrically, operated pressure control device connected to the reservoir, pump and two brake cylinders;

a controller for electrically controlling the electrically operated pressure control device to electrically control the pressures in the two brake cylinders; and a flow resistance control mechanism provided in a pump passage connecting said pump and said two brake cylinders, said flow resistance control mechanism controlling flows of the working fluid during operation of said pump such that when a difference between pressures of the fluid in said two brake cylinders is relatively large, a resistance of flow of the fluid from the pump toward a low-pressure cylinder of said two brake cylinders is increased relative to a resistance of flow of the fluid from the pump toward a high-pressure cylinder of said two brake cylinders;

wherein said flow resistance control mechanism includes at least one pilot-operated variable flow restrictor valve which is operated in response to said difference between the pressures in said two brake cylinders.

5. A braking system according to claim 4, wherein said at least one pilot-operated variable flow restrictor valve consists of one variable flow restrictor valve which includes (a) a housing, (b) a movable member movably supported by said housing and cooperating with said housing to define two pilot pressure chambers on opposite sides of said movable member, said two pilot pressure chambers receiving the pressures in said two brake cylinders, respectively, and (c) at least one valve member and two valve seats which are provided between said pump and said two brake cylinders and whose relative position changes according to a movement of said movable member, said two valve seats partially defining said two pilot pressure chambers which correspond to said high-pressure and low-pressure cylinders, respectively, said at least one valve member and said two valve seats being formed so as to increase the resistance of flow of the fluid from said pump toward said low-pressure cylinder when said at least one valve member is moved toward one of said two valve seats which corresponds to said low-pressure cylinder.

6. A braking system according to claim 5, wherein said movable member consists of a piston, and said at least one valve member consists of two valve members which are supported at opposite ends of said piston.

7. A braking system according to claim 5, wherein said at least one valve member consists of one valve member which also functions as said movable member.

8. A braking system according to claim 4, wherein said at least one pilot-operated variable flow restrictor valve consists of two variable flow restrictor valves which have respective two valve members disposed in respective two pilot pressure chambers which are formed between said pump and said two brake cylinders, respectively, each of said two valve members receiving the pressure in a corresponding one of said two brake cylinders and a delivery pressure of said pump, each of said two variable flow restrictor valves having at least one valve seat, said two valve members and said at least one valve seat of said each variable flow restrictor valve being formed so as to increase the resistance of flow of the fluid from said pump toward said low-pressure cylinder when one of said two valve members is moved toward the valve seat which corresponds to said low-pressure cylinder.

9. A braking system comprising:

a reservoir for storing a working fluid;

a pump which is operated to pressurize the working fluid received from the reservoir so as to intermittently deliver the pressurized fluid;

two brake cylinders to which the pressurized fluid delivered from the pump is distributed;

an electrically operated pressure control device connected to the reservoir, pump and two brake cylinders;

a controller for electrically controlling the electrically operated pressure control device to electrically control the pressures in the two brake cylinders;

a flow resistance control mechanism provided in a pump passage connecting said pump and said two brake cylinders, said flow resistance control mechanism controlling flows of the working fluid during operation of said pump such that when a difference between pressures of the fluid in said two brake cylinders is relatively large, a resistance of flow of the fluid from the pump toward a low-pressure cylinder of said two brake cylinders is increased relative to a resistance of flow of the fluid from the pump toward a high-pressure cylinder of said two brake cylinders; and a flow permitting mechanism provided in said pump passage, said flow permitting mechanism permitting a flow of the working fluid toward said low-pressure cylinder from at least one of said pump and said high-pressure brake cylinder, during at least one of a delivery period and non-delivery period of said pump;

wherein said flow resistance control mechanism includes at least one pilot-operated flow restrictor valve which is operated in response to said difference between the pressures in said two brake cylinders, each of said at least one flow restrictor valve includes at least one valve member and at least two valve seats which are formed such that a relative position between said at least one valve member and said at least two valve seats changes according to said difference between the pressures in said two brake cylinders, said flow permitting mechanism having at least one groove formed in at least one of said at least one valve member and said at least two valve seats, or at least one protrusion formed on at least one of said at least one valve member and said at least two valve seats, said at least one groove and said at least one protrusion permitting the fluid to flow from said at least one of said pump and said high-pressure cylinder toward said low-pressure cylinder even when said at least one valve member is seated on one of said at least two valve seats.

* * * * *